(12) United States Patent
Sivasubramanian et al.

(10) Patent No.: US 9,663,620 B2
(45) Date of Patent: May 30, 2017

(54) CATALYST FOR SYNTHESIS OF SILOXANES

(71) Applicant: MOMENTIVE PERFORMANCE MATERIALS INC., Waterford, NY (US)

(72) Inventors: Karthikeyan Sivasubramanian, Bangalore (IN); Patricia Anderson, Williamstown, MA (US)

(73) Assignee: MOMENTIVE PERFORMANCE MATERIALS INC., Waterford, NY (US)

( * ) Notice: Subject to any disclaimer, the term of this patent is extended or adjusted under 35 U.S.C. 154(b) by 0 days.

(21) Appl. No.: 14/891,803

(22) PCT Filed: May 16, 2014

(86) PCT No.: PCT/US2014/038396
§ 371 (c)(1),
(2) Date: Nov. 17, 2015

(87) PCT Pub. No.: WO2014/186709
PCT Pub. Date: Nov. 20, 2014

(65) Prior Publication Data
US 2016/0347910 A1 Dec. 1, 2016

Related U.S. Application Data

(60) Provisional application No. 61/824,705, filed on May 17, 2013.

(51) Int. Cl.
| | | |
|---|---|---|
| C08G 77/08 | (2006.01) |
| C09D 5/16 | (2006.01) |
| C09D 183/04 | (2006.01) |
| C09D 163/00 | (2006.01) |
| C09D 183/08 | (2006.01) |
| C09D 183/12 | (2006.01) |
| C09D 183/06 | (2006.01) |
| C08G 77/04 | (2006.01) |
| C09J 183/04 | (2006.01) |
| C08G 59/32 | (2006.01) |
| C08G 77/14 | (2006.01) |
| C08G 77/26 | (2006.01) |
| C08G 77/46 | (2006.01) |
| C08K 5/544 | (2006.01) |

(52) U.S. Cl.
CPC ......... *C08G 77/08* (2013.01); *C08G 59/3281* (2013.01); *C08G 77/04* (2013.01); *C09D 5/1637* (2013.01); *C09D 5/1693* (2013.01); *C09D 163/00* (2013.01); *C09D 183/04* (2013.01); *C09D 183/06* (2013.01); *C09D 183/08* (2013.01); *C09D 183/12* (2013.01); *C09J 183/04* (2013.01); *C08G 77/14* (2013.01); *C08G 77/26* (2013.01); *C08G 77/46* (2013.01); *C08K 5/544* (2013.01); *Y10T 428/31511* (2015.04); *Y10T 428/31663* (2015.04)

(58) Field of Classification Search
CPC ......... C07F 7/21; C07F 9/6584; C08K 5/5435
See application file for complete search history.

(56) References Cited

U.S. PATENT DOCUMENTS

| | | |
|---|---|---|
| 3,278,457 A | 10/1966 | Milgrom |
| 3,278,458 A | 10/1966 | Belner |
| 3,278,459 A | 10/1966 | Herold |
| 3,427,256 A | 2/1969 | Milgrom |
| 3,427,334 A | 2/1969 | Belner |
| 3,427,335 A | 2/1969 | Herold |
| 3,627,722 A | 12/1971 | Seiter |
| 3,632,557 A | 1/1972 | Brode et al. |
| 3,786,081 A | 1/1974 | Oppenhaender et al. |
| 3,971,751 A | 7/1976 | Isayama et al. |
| 4,312,801 A | 1/1982 | Bodin et al. |
| 4,345,053 A | 8/1982 | Rizk et al. |
| 4,481,367 A | 11/1984 | Knopf |
| 4,625,012 A | 11/1986 | Rizk et al. |
| 4,985,491 A | 1/1991 | Reisch |
| 5,504,234 A | 4/1996 | Omura et al. |
| 5,623,044 A | 4/1997 | Chiao |
| 5,852,137 A | 12/1998 | Hsieh et al. |
| 5,883,215 A | 3/1999 | Bischoff et al. |
| 5,919,888 A | 7/1999 | Lawrey et al. |
| 6,197,912 B1 | 3/2001 | Huang et al. |
| 6,207,794 B1 | 3/2001 | Yamasaki et al. |
| 6,244,962 B1 | 6/2001 | Bacher et al. |

(Continued)

FOREIGN PATENT DOCUMENTS

EP 0947531 A1 10/1999

OTHER PUBLICATIONS

ISA/EP, International Search Report and Written Opinion prepared for PCT/US2014/038396, dated Sep. 3, 2014.

(Continued)

*Primary Examiner* — Kuo-Liang Peng
(74) *Attorney, Agent, or Firm* — Joseph Waters; McDonald Hopkins LLC

(57) ABSTRACT

Compositions and methods for the production of siloxane materials using an azaphosphatrane as a catalyst. In one embodiment, there is provided a process for the ring opening polymerization of a cyclosiloxane in the presence of an azaphosphatrane. In another embodiment, there is provided a composition and method for condensation curing of a moisture curable composition using an azaphosphatrane.

15 Claims, No Drawings

(56) References Cited

U.S. PATENT DOCUMENTS

| | | |
|---|---|---|
| 6,303,731 B1 | 10/2001 | Carlson et al. |
| 6,310,170 B1 | 10/2001 | Johnston et al. |
| 6,359,101 B1 | 3/2002 | O'Connor et al. |
| 6,448,196 B1 | 9/2002 | Eglin et al. |
| 6,515,164 B1 | 2/2003 | Bolte et al. |
| 6,599,633 B1 | 7/2003 | Wolf et al. |
| 6,696,383 B1 | 2/2004 | Le-Khac et al. |
| 6,827,875 B2 | 12/2004 | Schelhaas et al. |
| 6,833,423 B2 | 12/2004 | Roesler et al. |
| 6,919,293 B1 | 7/2005 | Ooms et al. |
| 7,276,627 B2 * | 10/2007 | Valsan .................. C07C 217/84 562/872 |
| 7,569,653 B2 | 8/2009 | Landon |
| 7,776,988 B2 | 8/2010 | Fleury et al. |
| 2002/0198352 A1 | 12/2002 | Tanaka et al. |
| 2004/0122253 A1 | 6/2004 | Smith et al. |
| 2005/0020706 A1 | 1/2005 | Kollbach et al. |
| 2006/0155089 A1 | 7/2006 | Ferenz et al. |
| 2008/0097064 A1 | 4/2008 | Blanc-Magnard et al. |
| 2014/0377494 A1 * | 12/2014 | Determan .............. C08G 77/16 428/41.8 |

OTHER PUBLICATIONS

Thomson Scientific WPI Database, AN 2013-A33578, XP002728948, and JP 2013 001803 A, Week 201307, London, GB.

* cited by examiner

CATALYST FOR SYNTHESIS OF SILOXANES

CROSS REFERENCE TO RELATED APPLICATIONS

The present application is a 35 U.S.C. 371 national stage filing and claims priority to and the benefit of PCT Application No. PCT/US2014/038396 filed on May 16, 2014 and U.S. Provisional Application No. 61/824,705, titled "Catalyst for Synthesis of Siloxanes," filed on May 17, 2013, the disclosure of each of which is incorporated herein by reference in its entirety.

FIELD

The present invention relates to methods of forming siloxanes using an azaphosphatrane material as a catalyst. The azaphosphatranes can be used in ring opening polymerization reactions and as a condensation cure catalyst.

BACKGROUND

Cyclic siloxanes are often used as starting monomers to form polysiloxanes. Generally polysiloxanes can be formed by the ring opening polymerization of cyclic siloxanes and a suitable end-capping unit. The reaction is carried out in the presence of a catalyst.

Various catalysts are known for the polymerization of cyclosiloxanes. Examples are alkali metal hydroxides, alkali metal alkoxides or complexes of alkali metal hydroxides and an alcohol, alkali metal silanolates, and phosphonitrile halides (sometimes referred to as acidic phosphazenes). Such polymerizations can be carried out in bulk, in solvents (such as non-polar or polar organic solvents) or in emulsion. Phosphazene bases and carbenes have been described as suitable catalyst for the ring opening polymerization of siloxanes. An endblocking agent may be used to regulate the molecular weight of the polymer and/or to add functionality. Polymerisation may be terminated by using a neutralizing agent which reacts with the catalyst to render it non-active. In most cases catalyst residues remain in the polymer product and are desirably removed, such as by filtration.

Solid type catalysts can be used as a catalyst to synthesize polydimethylsiloxane (PDMS) fluids and PDMS functional fluids by ring opening polymerization. Solid type catalysts exhibit high catalytic activity, but generate solid waste. The solid waste is typically incinerated. Additionally, the solid waste contains a significant fraction of the product, which decreases the overall yield and can increase production costs.

Curable compositions such as moisture curable compositions also employ catalysts to promote curing and formation of the polymer network. Metal catalysts are typically used as condensation cure catalysts to accelerate the moisture-assisted curing of polyorganosiloxanes and non-silicone polymers having reactive terminal silyl groups in room temperature vulcanizing compositions. Organotin, such as dibutyltindilaurate (DBTDL), is commonly used as a catalyst in such compositions. Environmental regulatory agencies and directives, however, have increased or are expected to increase restrictions on the use of organotin compounds in formulated products. For example, while formulations with greater than 0.5 wt. % dibutyltin presently require labeling as toxic with reproductive 1B classification, dibutyltin-containing formulations are proposed to be completely phased out in consumer applications during the next four to six years.

The use of alternative organotin compounds such as dioctyltin compounds and dimethyltin compounds can only be considered as a short-term remedial plan, as these organotin compounds may also be regulated in the future. Desirably, substitutes for organotin catalysts should exhibit properties similar to organotin compounds in terms of curing, storage, and appearance. Non-tin catalysts would also desirably initiate the condensation reaction of the selected polymers and complete this reaction upon the surface and may be in the bulk in a desired time schedule. There are therefore many proposals for the replacement of organometallic tin compounds with other metal-based compounds. These compounds comprise metals such as Ca, Ce, Bi, Fe, Mo, Mn, Pb, Ti, V, Zn, and Y. These other metals have specific advantages and disadvantages in view of replacing tin compounds perfectly. Non-metal catalysts are also of interest. Therefore, there is still a need to address the limitations of possible metal compounds as suitable catalysts for condensation cure reactions. The physical properties of uncured and cured compositions also warrant examination, in particular to maintain the ability to adhere onto the surface of several substrates.

SUMMARY

The present invention provides compositions, methods, and processes to form polysiloxanes and to promote the curing of curable siloxane compositions.

In one aspect, the present invention provides a process to form polysiloxanes by the ring opening polymerization of cyclosiloxanes. The process comprises contacting a cyclosiloxane with an azaphosphatrane.

In one embodiment, the azaphosphatrane is of the formula:

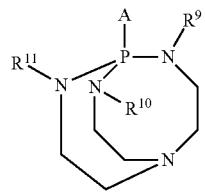

where $R^9$, $R^{10}$, and $R^{11}$ are independently chosen from hydrogen, a linear or branched alkyl comprising 1 to 10 carbon atoms, an aromatic group comprising 6 to 12 carbon atoms, and a substituted phosphorous group with or without nitrogen; and A is chosen from hydrogen, $R^{12}$, or $(R^{13}R^{14}P-N)t$, where $R^{12}$, $R^{13}$, and $R^{14}$ are independently chosen from hydrogen, a linear or branched alkyl comprising 1 to 10 carbon atoms, and an aromatic group comprising 6 to 12 carbon atoms; and t is 1 to 10.

In one embodiment, the azaphosphatrane is present in an amount of from about 0.05 weight percent to about 5 weight percent based on the total weight of the cyclosiloxane; even from about 0.1 weight percent to about 0.4 weight percent based on the total weight of the cyclosiloxane.

In one embodiment, the process comprises deactivating the catalyst. In on embodiment, deactivating the catalyst comprises: heating the product of the process at a temperature of about 100° C. or greater after the reaction; treating the product with water; bubbling carbon dioxide through the product; treating the product with a material to neutralize the catalyst, or a combination of two or more thereof.

In another embodiment, the process further comprises filtering the reaction mixture.

In another embodiment, the process further comprises treating the filtered reaction mixture with charcoal.

In another aspect, the present invention provides a curable composition and methods of forming such compositions comprising a catalyst comprising an azaphosphatrane.

In one embodiment, the present invention provides a composition for forming a cured polymer composition comprising:

(A) a polymer having at least a reactive silyl group;
(B) a crosslinker or chain extender;
(C) a catalyst comprising an azaphosphatrane compound; and
(D) an optional adhesion promoter.

In one embodiment, the azaphosphatrane is of the formula:

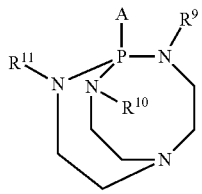

where $R^9$, $R^{10}$, and $R^{13}$ are independently chosen from hydrogen, a linear or branched alkyl comprising 1 to 10 carbon atoms, and an aromatic group comprising 6 to 12 carbon atoms, and a substituted phosphorous group with or without nitrogen; and A is chosen from hydrogen, $R^{12}$, or $(R^{13}R^{14}P=N=)t$, where $R^{12}$, $R^{13}$, and $R^{14}$ are independently chosen from hydrogen, a linear or branched alkyl comprising 1 to 10 carbon atoms, and an aromatic group comprising 6 to 12 carbon atoms; and t is 1 to 10.

These and other aspects of the invention are further illustrated with respect to the following description.

DETAILED DESCRIPTION

Ring Opening Polymerization

The present invention provides, in one aspect, a process for the ring opening polymerization of cyclosiloxanes. The method comprises contacting a cyclosiloxane with an azaphosphatrane material. The inventors have found that azaphosphatrane materials can be suitable for catalyzing the ring-opening polymerization of cyclosiloxanes. The reaction can be carried out in a suitable solvent. The reaction can also be carried out in the presence of water to the extent that the catalytic activity of the catalyst does not deteriorate.

The azaphosphatrane material can be chosen from a compound of the Formula (1):

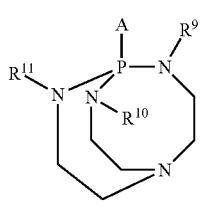

(1)

where $R^9$, $R^{10}$, and $R^{11}$ are independently chosen from hydrogen, a linear or branched alkyl comprising 1 to 10 carbon atoms, and an aromatic group comprising 6 to 12 carbon atoms, and a substituted phosphorous group with or without nitrogen; A is chosen from hydrogen, $R^{12}$, or $(R^{13}R^{17}P=N=)t$, where $R^{12}$, $R^{13}$, and $R^{14}$ are independently chosen from hydrogen, a linear or branched alkyl comprising 1 to 10 carbon atoms, and an aromatic group comprising 6 to 12 carbon atoms; and t is 1 to 10. Suitable alkyl groups include, but are not limited to, methyl, ethyl, propyl, butyl, pentyl, hexyl, octyl, isopropyl, isobutyl, etc. Suitable aromatic groups include, but are not limited to phenyl, benzyl, naphthyl, etc.

In one embodiment, the azaphosphatrane compound can be chosen from a compound of Formulas (2)-(4):

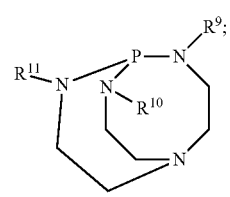

(2)

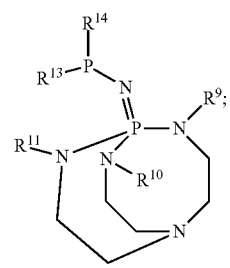

(3)

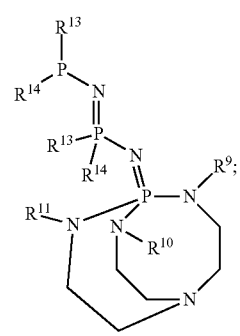

(4)

and combinations of two or more thereof, where $R^9$-$R^{14}$ can be as described above. In one embodiment, the azaphosphatrane material is chosen from a compound of Formulas (2)-(4) where $R^9$, $R^{10}$, and $R^{11}$ are chosen from methyl, isopropyl, isobutyl, or a combination of two or more thereof.

It will be appreciated that one or more different azaphosphatrane materials can be used as the catalyst material in the ring opening polymerization process.

The polymerization can be carried out in bulk or in the presence of a solvent. Suitable solvents are liquid hydrocarbons or silicone fluids. The azaphosphatrane catalyst can be diluted in a hydrocarbon solvent, such as hexane or heptane, or dispersed in a silicone fluid such as polydiorganosiloxanes. Where the azaphosphatrane catalyst is initially in a solvent such as hexane, the hexane can be removed by evaporation under vacuum, and the catalyst dispersed in a silicone fluid to give a stable clear solution. The reaction can include water, but of a concentration that will not result in deactivation or deterioration of the catalyst.

The polymerization reaction can be carried out at ambient temperature or under heating. Generally, heating can be carried out up to about 100° C. The catalyst can facilitate the reaction at lower temperatures. The catalysts tend to decompose when heated above 100° C. In one embodiment, the method comprises heating the reaction system to a temperature above 100° C., after the reaction is complete, to decompose and remove the catalyst from the system. This eliminates the neutralization step typically required with conventional catalysts.

The time taken for polymerization will depend on the activity of the catalyst in the chosen system, and on the desired polymer product. In the absence of moderation, the azaphosphatrane catalysts are sufficiently active to convert cyclosiloxanes, such as D4, to high molecular weight polysiloxane gums within a few hours.

The starting material is a cyclosiloxane (also known as a cyclic siloxane). Cyclic siloxanes are useful and commercially available materials. They have the general formula $(R^{15}R^{16}SiO)_n$, wherein $R^{15}$ and $R^{16}$ are independently chosen from an alkyl, alkenyl, aryl, alkaryl, or aralkyl group having up to 8 carbon atoms, which may be unsubstituted or substituted, and n denotes an integer with a value of from 3 to 12. $R^{15}$ and $R^{16}$ can be substituted, e.g., by halogen such as fluorine or chlorine. The alkyl group can be, for example, methyl, ethyl, n-propyl, trifluoropropyl, n-butyl, sec-butyl, and tert-butyl. The alkenyl group can be, for example, vinyl, allyl, propenyl, and butenyl. The aryl and aralkyl groups can be, for example, phenyl, tolyl, and benzoyl. In one embodiment, at least 80% of all $R^{15}$ and $R^{16}$ groups are methyl or phenyl groups. In one embodiment, substantially all $R^{15}$ and $R^{16}$ groups are methyl groups. Where $R^{15}$ and $R^{16}$ are methyl, the compound is referred to as Dn; for example, where n=4 the compound is called D4. The value of n can be from 3 to 6, and in one embodiment is 4 or 5. Examples of suitable cyclic siloxanes are octamethyl cyclotetrasiloxane (D4), hexamethylcyclotrisiloxane (D3), octaphenylcyclotetrasiloxane, tetramethylcyclotetrasiloxane, tetramethyltetravinylcyclotetrasiloxane, hexamethyl-1,1-diphenylcyclotetrasiloxane, decamethyl pentacyclosiloxane, cyclopenta (methylvinyl) siloxane, and cyclotetra(phenylmethyl) siloxane. One particularly suitable commercially available material is a mixture of octamethylcyclo-tetrasiloxane and decamethylcyclopentasiloxane.

In one embodiment, the reaction mixture comprises two or more cyclic siloxanes. In one embodiment, the reaction mixture comprises a mixture of at least two cyclic siloxanes of different ring sizes. In one embodiment, at least one of the cyclic siloxanes comprises one or more functional groups chosen from vinyl, amine, etc.

The process can further comprise adding an endblocker material. The endblocker material is generally not limited and can be chosen as desired for a particular purpose or end use. In one embodiment, the endblocker material is chosen from hexamethyldisiloxane; octamethyltrisiloxane; decamethyltetrasiloxane; dodecamethylpentasiloxane; tetradecamethylhexasiloxane; hexadecamethylheptasiloxane, or a combination of two or more thereof.

The reaction mixture is generally purged with inert gas, preferably nitrogen, prior to addition of the catalyst so as to remove any dissolved $CO_2$. Because of the extremely rapid reaction, the reaction mixture is vigorously mixed to ensure homogenous dispersion of the catalyst. Inadequate mixing can result in the catalyst being encapsulated in beads of gum as it is added to the reaction, and the catalyst then takes some time to diffuse out of the gum particles, giving a slower reaction.

The azaphosphatrane catalyst can be present in an amount of from about 0.025 weight percent to about 5 weight percent; 0.05 weight percent to about 4.5 weight percent; 0.1 weight percent to about 4 weight percent; 0.25 weight percent to about 3 weight percent; 0.4 weight percent to about 2 weight percent; event from about 0.5 weight percent to about 1 weight percent, based on the weight of the starting cyclic siloxane material. In one embodiment, the azaphosphatrane catalyst is present in an amount of from about 0.1 weight percent to about 0.4 weight percent based on the weight of the cyclosiloxane material. Here as elsewhere in the specification and claims, numerical values can be combined to form new and non-disclosed ranges.

The method can further comprise deactivating the catalyst. Deactivating the catalyst can comprise removing the catalyst from the reaction system. In one embodiment, deactivating the catalyst can be accomplished by heating the reaction system to a temperature of about 100° C. or greater. In one embodiment, the catalyst can be deactivated by heating the reaction system to a temperature of about 110° C. or greater; 120° C. or greater; even 130° C. or greater. The catalyst can also be deactivated by treating the reaction system with water, bubbling carbon dioxide through the system; and/or treating with an agent to neutralize the azaphosphatrane compound. Suitable acids to neutralize the catalyst include, but are not limited to mineral acids and ion exchange resins. It will be appreciated that one or more of the above deactivation operations can be employed to deactivate the catalyst. The present catalysts provide an advantage over other types of catalysts such as acidic clay that require filtering the clay particles dispersed in the reaction medium.

Following deactivation, the reaction system can be treated as desired or necessary to remove any color present in the system. Such treatments can include filtering the sample such as through a celite bed, treating with charcoal, etc.

Moisture Curable Compositions

The present invention provides a curable composition employing an azaphosphatrane catalyst as a condensation catalyst. Compositions comprising azaphosphatrane materials can exhibit good curing properties as compared to compositions employing organotin compounds, such as DBTDL, in terms of accelerating moisture-assisted condensation curing of silicones to result in cross-linked silicones that can be used as sealants and RTVs (Room-Temperature Vulcanized Rubber). The non-toxic nature of these compounds makes them more attractive and practical than organotin catalysts, given the forthcoming strict regulations on organotin catalysts.

In one embodiment, the present invention provides a curable composition comprising a polymer component (A) comprising a reactive terminal silyl group; a crosslinker component (B); a catalyst component (C) comprising an azaphosphatrane compound; optionally an adhesion promoter component (D); an optional filler component (E); optionally an acidic compound (F), and optionally auxiliary components (G).

The polymer component (A) may be a liquid- or solid-based polymer having a reactive terminal silyl group. The polymer component (A) is not particularly limited and may be chosen from any silyl cross-linkable polymer as may be desired for a particular purpose or intended use. Non-limiting examples of suitable polymers for the polymer component (A) include polyorganosiloxanes (A1) or organic polymers free of siloxane bonds (A2), wherein the polymers (A1) and (A2) comprise reactive terminal silyl groups. In one embodiment, the polymer component (A) may be present in an amount of from about 10 to about 90 wt. % of the curable composition. In one embodiment, the curable composition comprises about 100 pt. wt. of the polymer component (A).

As described above, the polymer component (A) may include a wide range of polyorganosiloxanes. In one embodiment, the polymer component may comprise one or more polysiloxanes and copolymers of formula (5):

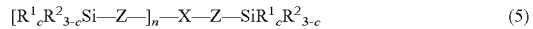

$R^1$ may be chosen from linear or branched alkyl, linear or branched heteroalkyl, cycloalkyl, heterocycloalkyl, aryl, heteroaryl, linear or branched aralkyl, linear or branched heteroaralkyl, or a combination of two or more thereof. In one embodiment, $R^1$ may be chosen from $C_1$-$C_{10}$ alkyl; $C_1$-$C_{10}$ alkyl substituted with one or more of Cl, F, N, O, or S; phenyl; $C_7$-$C_{16}$ alkylaryl; $C_7$-$C_{16}$ arylalkyl; $C_2$-$C_{20}$ polyalkylene ether; or a combination of two or more thereof. Exemplary preferred groups are methyl, trifluoropropyl, and/or phenyl groups.

$R^2$ may be a group reactive to protic agents such as water. Exemplary groups for $R^2$ include OH, alkoxy, alkoxyalkyl, alkenyloxy, alkyloximo, alkylcarboxy, arylcarboxy, alkylamido, arylamido, or a combination of two or more thereof. In one embodiment, $R^2$ is chosen from OH, $C_1$-$C_8$ alkoxy, $C_2$-$C_{18}$ alkoxyalkyl, amino, alkenyloxy, alkyloximo, alkylamino, arylamino, alkylcarboxy, arylcarboxy, alkylamido, arylamido, alkylcarbamato, arylcarbamato, or a combination of two or more thereof.

Z may be a bond, a divalent linking unit selected from the group of O, hydrocarbons which can contain one or more O, S, or N atom, amide, urethane, ether, ester, urea units or a combination of two or more thereof. If the linking group Z is a hydrocarbon group, then Z is linked to the silicon atom over a silicon-carbon bond. In one embodiment, Z is chosen from a $C_1$-$C_{14}$ alkylene.

X is chosen from a polyurethane; a polyester; a polyether; a polycarbonate; a polyolefin; a polyester ether; and a polyorganosiloxane having units of $R^1_3SiO_{1/2}$, $R^1_2SiO$, $R^1SiO_{3/2}$, and/or $SiO_2$, where $R^1$ is defined as above. X may be a divalent or multivalent polymer unit selected from the group of siloxy units linked over oxygen or hydrocarbon groups to the terminal silyl group comprising the reactive group $R^2$ as described above, polyether, polyalkylene, polyisoalkylene, polyester, or polyurethane units linked over hydrocarbon groups to the silicon atom comprising one or more reactive groups $R^2$ as described above. The hydrocarbon group X can contain one or more heteroatoms such as N, S, O, or P forming amides, esters, ethers, urethanes, esters, and/or ureas. In one embodiment, the average polymerization degree ($P_n$) of X should be more than 6, e.g. polyorganosiloxane units of $R^1_3SiO_{1/2}$, $R^1_2SiO$, $R^1SiO_{3/2}$, and/or $SiO_2$. In formula (5), n is 0 to 100; desirably 1, and c is 0 to 2, desirably 0 to 1.

Non-limiting examples of the components for unit X include polyoxyalkylene polymers such as polyoxyethylene, polyoxypropylene, polyoxybutylene, polyoxyethylene-polyoxypropylene copolymer, polyoxytetramethylene, or polyoxypropylene-polyoxybutylene copolymer; ethylene-propylene copolymer, polyisobutylene, polychloroprene, polyisoprene, polybutadiene, copolymer of isobutylene and isoprene, copolymers of isoprene or butadiene and acrylonitrile and/or styrene, or hydrocarbon polymers such as hydrogenated polyolefin polymers produced by hydrogenating these polyolefin polymers; polyester polymer manufactured by a condensation of dibasic acid such as adipic acid or phthalic acid and glycol, or ring-opening polymerization of lactones; polyacrylic acid ester produced by radical polymerization of a monomer such as $C_2$-$C_8$-alkyl acrylates, vinyl polymers, e.g., acrylic acid ester copolymer of acrylic acid ester such as ethyl acrylate or butyl acrylate and vinyl acetate, acrylonitrile, methyl methacrylate, acrylamide, or styrene; graft polymer produced by polymerizing the above organic polymer with a vinyl monomer; polycarbonates; polysulfide polymer; polyamide polymer such as Nylon 6 produced by ring-opening polymerization of ε-caprolactam, Nylon 6-6 produced by polycondensation of hexamethylenediamine and adipic acid, etc., Nylon 12 produced by ring-opening polymerization of ε-laurolactam, copolymeric polyamides, polyurethanes, or polyureas.

Particularly suitable polymers include, but are not limited to, polysiloxanes, polyoxyalkylenes, saturated hydrocarbon polymers such as polyisobutylene, hydrogenated polybutadiene and hydrogenated polyisoprene, or polyethylene, polypropylene, polyesters, polycarbonates, polyurethanes, polyurea polymers and the like. Furthermore, saturated hydrocarbon polymer, polyoxyalkylene polymer, and vinyl copolymer are particularly suitable due to their low glass transition temperature which provide a high flexibility at low temperatures, i.e., below 0° C.

The reactive silyl groups in formula (5) can be introduced by employing silanes containing a functional group which has the ability to react by known methods with unsaturated hydrocarbons via hydrosilylation, or reaction of SiOH, aminoalkyl or -aryl, HOOC-alkyl or -aryl, HO-alkyl or -aryl, HS-alkyl or -aryl, Cl(O)C-alkyl or -aryl, epoxyalkyl or epoxycycloalkyl groups in the prepolymer to be linked to a reactive silyl group via condensation or ring-opening reactions. Examples of the main embodiments include the following: (i) siloxane prepolymers having a SiOH group that can undergo a condensation reaction with a silane (LG) $SiR^1_cR^2_{3-c}$ whereby a siloxy bond ≡Si—O—$SiR^1_cR^2_{3-c}$ is formed while the addition product of the leaving group (LG) and hydrogen is released (LG-H); (ii) silanes having an unsaturated group that is capable of reacting via hydrosilylation or radical reaction with a SiH group or radically activated groups of a silane such as SiII or an unsaturated group; and (iii) silanes including organic or inorganic prepolymers having OH, SH, amino, epoxy, —COCl, —COOH groups, which can react complementarily with epoxy, isocyanato, OH, SH, cyanato, carboxylic halogenides, reactive alkylhalogenides, lactones, lactams, or amines, that is to link the reactive prepolymer with the organofunctional silanes to yield a silyl functional polymer.

Silanes suitable for method (i) include alkoxysilanes, especially tetraalkoxysilanes, di- and trialkoxysilanes, di- and triacetoxysilanes, di- and triketoximosilanes, di- and trialkenyloxysilanes, di- and tricarbonamidosilanes, wherein the remaining residues at the silicon atom of the silane are substituted or unsubstituted hydrocarbons. Other non-limiting silanes for method (i) include alkyltrialkoxysilanes, such as vinyltrimethoxysilane, methyltrimethoxysilane, propyltrimethoxysilane, aminoalkyltrimethoxysilane, ethyltriacetoxysilane, methyl- or propyltriacetoxysilane, methyltributanonoximosilane, methyltripropenyloxysilane, methyltribenzamidosilane, or methyltriacetamidosilane. Prepolymers suitable for reaction under method (i) are SiOH-terminated polyalkylsiloxanes, which can undergo a condensation reaction with a silane having hydrolyzable groups attached to the silicon atom. Exemplary SiOH-terminated polyalkyldisiloxanes include polydimethylsiloxanes.

Suitable silanes for method (ii) include alkoxysilanes, especially trialkoxysilanes (HSi(OR)$_3$) such as trimethoxysilane, triethoxysilane, methyldiethoxysilane, methyldimethoxysilane, and phenyldimethoxysilane. Hydrogenchlorosilanes are in principle possible but are less desirable due to the additional replacement of the halogen through an alkoxy, acetoxy group, etc. Other suitable silanes include organofunctional silanes having unsaturated groups which can be activated by radicals, such as vinyl, allyl, mercaptoalkyl, or acrylic groups. Non-limiting examples include vinyltrimethoxysilane, mercaptopropyltrimethoxysilane, and methacryloxypropyltrimethoxysilane. Prepolymers suitable for reaction under method (ii) include vinyl-terminated polyalkylsiloxanes, preferably polydimethylsiloxanes, hydrocarbons with unsaturated groups which can undergo hydrosilylation or can undergo radically induced grafting reactions with a corresponding organofunctional group of a silane comprising, for example, unsaturated hydrocarbon or a SiH group.

Another method for introducing silyl groups into hydrocarbon polymers can be the copolymerization of unsaturated hydrocarbon monomers with the unsaturated groups of silanes. The introduction of unsaturated groups into a hydrocarbon prepolymer may include, for example, the use of alkenyl halogenides as chain stopper after polymerization of the silicon free hydrocarbon moiety.

Desirable reaction products between the silanes and prepolymers include the following structures:

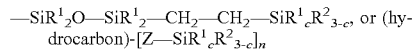

—SiR$^1$$_2$O—SiR$^1$$_2$—CH$_2$—CH$_2$—SiR$^1$$_c$R$^2$$_{3-c}$, or (hydrocarbon)-[Z—SiR$^1$$_c$R$^2$$_{3-c}$]$_n$ Suitable silanes for method (iii) include, but are not limited to, alkoxy silanes, especially silanes having organofunctional groups to be reactive to —OH, —SH, amino, epoxy, —COCl, or —COOH.

In one embodiment, these silanes have an isocyanatoalkyl group such as gamma-isocyanatopropyltrimethoxysilane, gamma-isocyanatopropylmethyldimethoxysilane, gamma-isocyanatopropyltriethoxysilane, gamma-glycidoxypropylethyldimethoxysilane, gamma-glycidoxypropyltrimethoxysilane, gamma-glycidoxypropyltriethoxysilane, beta-(3,4-epoxycyclohexyl)ethyltrimethoxysilane, beta-(3,4-epoxycyclohexyl)ethyltriethoxysilane, epoxylimonyltrimethoxysilane, N-(2-aminoethyl)-aminopropyltrimethoxysilane, gamma-aminopropyltriethoxysilane, gamma-aminopropyltrimethoxysilane, gamma-aminopropylmethyldimethoxysilane, gamma-aminopropylmethyldiethoxysilane, etc.

In one embodiment, it is desirable to select either blocked amines or isocyanates (Z'—X)$_n$—Z' for carrying out first a complete mixing and then the following coupling reaction. Examples of blocking agents are disclosed in EP 0947531 and other blocking procedures that employ heterocyclic nitrogen compounds such as caprolactam or butanone oxime, or cyclic ketones referred to in U.S. Pat. No. 6,827,875 both of which are incorporated herein by reference in their entirety.

Examples of suitable prepolymers for a reaction under method (iii) include, but are not limited to, polyalkylene oxides having OH groups, preferably with a high molecular weight (M$_w$, weight-average molecular weight>6000 g/mol) and a polydispersity M$_w$/M$_n$ of less than 1.6; urethanes having remaining NCO groups, such as NCO functionalized polyalkylene oxides, especially blocked isocyanates. Prepolymers selected from the group of hydrocarbons having —OH, —COOH, amino, epoxy groups, which can react complementarily with an epoxy, isocyanato, amino, carboxyhalogenide or halogenalkyl group of the corresponding silane having further reactive groups useful for the final cure.

Suitable isocyanates for the introduction of a NCO group into a polyether may include toluene diisocyanate, diphenylmethane diisocyanate, or xylene diisocyanate, or aliphatic polyisocyanate such as isophorone diisocyanate, or hexamethylene diisocyanate.

The polymerization degree of the unit X depends on the requirements of viscosity and mechanical properties of the cured product. If X is a polydimethylsiloxane unit, the average polymerization degree based on the number average molecular weight M$_n$ is preferably 7 to 5000 siloxy units, preferably 200 to 2000 units. In order to achieve a sufficient tensile strength of >5 MPa, an average polymerization degree P$_n$ of >250 is suitable whereby the polydimethylsiloxanes have a viscosity of more than 300 mPa·s at 25° C. If X is a hydrocarbon unit other than a polysiloxane unit, the viscosity with respect to the polymerization degree is much higher.

Examples of the method for synthesizing a polyoxyalkylene polymer include, but are not limited to, a polymerization method using an alkali catalyst such as KOH, a polymerization method using a metal-porphyrin complex catalyst such as a complex obtained by reacting an organoaluminum compound, a polymerization method using a composite metal cyanide complex catalyst disclosed, e.g., in U.S. Pat. Nos. 3,427,256; 3,427,334; 3,278,457; 3,278,458; 3,278,459; 3,427,335; 6,696,383; and 6,919,293.

If the group X is selected from hydrocarbon polymers, then polymers or copolymers having isobutylene units are particularly desirable due to its physical properties such as excellent weatherability, excellent heat resistance, and low gas and moisture permeability.

Examples of the monomers include olefins having 4 to 12 carbon atoms, vinyl ether, aromatic vinyl compound, vinylsilanes, and allylsilanes. Examples of the copolymer component include 1-butene, 2-butene, 2-methyl-1-butene, 3-methyl-1-butene, pentene, 4-methyl-1-pentene, hexene, vinylcyclohexene, methyl vinyl ether, ethyl vinyl ether, isobutyl vinyl ether, styrene, alpha-methylstyrene, dimethylstyrene, beta-pinene, indene, and for example, but not limited to, vinyltrialkoxysilanes, e.g. vinyltrimethoxysilane, vinylmethyldichlorosilane, vinyldimethylmethoxysilane, divinyldichlorosilane, divinyldimethoxysilane, allyltrichlorosilane, allylmethyldichlorosilane, allyldimethylmethoxysilane, diallyldichlorosilane, diallyldimethoxysilane, gamma-methacryloyloxypropyltrimethoxysilane, and gamma-methacryloyloxypropylmethyldimethoxysilane.

Examples of suitable siloxane-free organic polymers include, but are not limited to, silylated polyurethane (SPUR), silylated polyester, silylated polyether, silylated polycarbonate, silylated polyolefins like polyethylene, polypropylene, silylated polyesterether and combinations of two or more thereof. The siloxane-free organic polymer may be present in an amount of from about 10 to about 90 wt. % of the composition or about 100 pt. wt.

In one embodiment, the polymer component (A) may be a silylated polyurethane (SPUR). Such moisture curable compounds are known in the art in general and can be obtained by various methods including (i) reacting an isocyanate-terminated polyurethane (PUR) prepolymer with a suitable silane, e.g., one possessing both hydrolyzable functionality at the silicon atom, such as, alkoxy, etc., and secondly active hydrogen-containing functionality such as mercaptan, primary or secondary amine, preferably the latter, etc., or by (ii) reacting a hydroxyl-terminated PUR (polyurethane) prepolymer with a suitable isocyanate-terminated silane, e.g., one possessing one to three alkoxy groups. The details of these reactions, and those for preparing the isocyanate-terminated and hydroxyl-terminated FUR prepolymers employed therein can be found in, amongst others: U.S. Pat. Nos. 4,985,491; 5,919,888; 6,207,794; 6,303,731; 6,359,101; and 6,515,164, and published U.S. Patent Publication Nos. 2004/0122253 and US 2005/0020706 (isocyanate-terminated PUR prepolymers); U.S. Pat. Nos. 3,786,081 and 4,481,367 (hydroxyl-terminated PUR prepolymers); U.S. Pat. Nos. 3,627,722; 3,632,557; 3,971,751; 5,623,044; 5,852,137; 6,197,912; and 6,310,170 (moisture-curable SPUR (silane modified/terminated polyurethane) obtained from reaction of isocyanate-terminated PUR prepolymer and reactive silane, e.g., aminoalkoxysilane); and, U.S. Pat. Nos. 4,345,053; 4,625,012; 6,833,423; and published U.S. Patent Publication 2002/0198352 (moisture-curable SPUR obtained from reaction of hydroxyl-terminated PUR prepolymer and isocyanatosilane). The entire contents of the foregoing U.S. patent documents are incorporated by reference herein. Other examples of moisture-curable SPUR materials include those described in U.S. Pat. No. 7,569,653, the disclosure of which is incorporated by reference in its entirety.

In one embodiment, the polymer component (A) may be a polymer of formula (3):

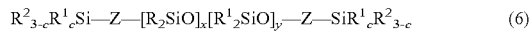

$$R^2_{3-c}R^1_cSi-Z-[R_2SiO]_x[R^1_2SiO]_y-Z-SiR^1_cR^2_{3-c} \quad (6)$$

where $R^1$, $R^2$, Z, and c are defined as above with respect to formula (6); R is $C_1$-$C_6$ alkyl (an exemplary alkyl being methyl); x is 0 to about 10,000, in one embodiment from 11 to about 2500; and y is 0 to about 10,000; preferably 0 to 500. In one embodiment, Z in a compound of formula (6) is a bond or a divalent $C_1$-$C_{14}$ alkylene group, especially preferred is —$C_2H_4$—.

In one embodiment, the polymer component (A) may be a polyorganosiloxane of the formula (7):

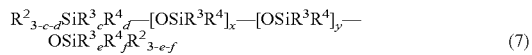

$$R^2_{3-e-f}SiR^3_eR^4_f-[OSiR^3R^4]_x-[OSiR^3R^4]_y-OSiR^3_eR^4_fR^2_{3-e-f} \quad (7)$$

$R^3$ and $R^4$ can be identical or different on the same silicon atom and are chosen from hydrogen; $C_1$-$C_{10}$ alkyl; $C_1$-$C_{10}$ heteroalkyl, $C_3$-$C_{12}$ cycloalkyl; $C_2$-$C_{30}$ heterocycloalkyl; $C_6$-$C_{13}$ aryl; $C_7$-$C_{30}$ alkylaryl; $C_7$-$C_{30}$ arylalkyl; $C_4$-$C_{12}$ heteroaryl; $C_5$-$C_{30}$ heteroarylalkyl; $C_5$-$C_{30}$ heteroalkylaryl; $C_2$-$C_{100}$ polyalkylene ether; or a combination of two or more thereof. $R^2$, c, x, and y are as defined above; d is 0, 1, or 2; e is 0, 1, or 2; and f is 0, 1, or 2.

Non-limiting examples of suitable polysiloxane-containing polymers (A1) include, for example, silanol-stopped polydimethylsiloxane, silanol or alkoxy-stopped polyorganosiloxanes, e.g., methoxystopped polydimethylsiloxane, alkoxy-stopped polydimethylsiloxane-polydiphenylsiloxane copolymer, and silanol or alkoxy-stopped fluoroalkyl-substituted siloxanes such as poly(methyl 3,3,3-trifluoropropyl) siloxane and poly(methyl 3,3,3-trifluoropropyl)siloxane-polydimethyl siloxane copolymer. The polyorganosiloxane component (A1) may be present in an amount of about 10 to about 90 wt. % of the composition or 100 pt. wt. In one preferred embodiment, the polyorganosiloxane component has an average chain length in the range of about 10 to about 2500 siloxy units, and the viscosity is in the range of about 10 to about 500,000 mPa·s at 25° C.

Alternatively, the composition may include silyl-terminated organic polymers (A2) that are free of siloxane units, and which undergo curing by a condensation reaction comparable to that of siloxane containing polymers (A1). Similar to the polyorganosiloxane polymer (A1), the organic polymers (A2) that are suitable as the polymer component (A) include a terminal silyl group. In one embodiment, the terminal silyl group may be of the formula (8):

$$-SiR^1_dR^2_{3-d} \quad (8)$$

where $R^1$, $R^2$, and d are as defined above.

The polysiloxane composition may further include a crosslinker or a chain extender as component (B). In one embodiment, the crosslinker is of the formula (9):

$$R^1_dSiR^2_{4-d} \quad (9)$$

wherein $R^1$, $R^2$, and d are as defined above. Alternatively, the crosslinker component may be a condensation product of formula (9) wherein one or more but not all $R^2$ groups are hydrolyzed and released in the presence of water and then intermediate silanols undergo a condensation reaction to give a Si—O—Si bond and water. The average polymerization degree can result in a compound having 2 to 10 Si units.

In one embodiment, the crosslinker is an alkoxysilane having a formula $R^3_d(R^1O)_{4-d}Si$, wherein $R^1$, $R^3$, and d are defined as above. In another embodiment, the crosslinker is an acetoxysilane having a formula $(R^3_d(R^1CO_2)_{4-d}Si$, wherein $R^1$, $R^3$, and d are defined as above. In still another embodiment, the crosslinker is an oximosilane having a formula $R^3_d(R^1R^4C=N-O)_{4-d}Si$, where $R^1$, $R^3$, $R^4$, and d are defined as above.

As used herein, the term crosslinker includes a compound including an additional reactive component having at least two hydrolysable groups and less than three silicon atoms per molecule not defined under (A). In one embodiment, the crosslinker or chain extender may be chosen from an alkoxysilane, an alkoxysiloxane, an oximosilane, an oximosiloxane, an enoxysilane, an enoxysiloxane, an aminosilane, an aminosiloxane, a carboxysilane, a carboxysiloxane, an alkylamidosilane, an alkylamidosiloxane, an arylamidosilane, an arylamidosiloxane, an alkoxyaminosilane, an alkylarylaminosiloxane, an alkoxycarbamatosilane, an alkoxycarbamatosiloxane, an imidatosilane, a ureidosilane, an isocyanatosilane, a isothiocyanatosilane, and combinations of two or more thereof. Examples of suitable cross-linkers include, but are not limited to, tetraethylorthosilicate (TEOS); methyltrimethoxysilane (MTMS); methyltriethoxysilane; vinyltrimethoxysilane; vinyltriethoxysilane; methylphenyldimethoxysilane; 3,3,3-trifluoropropyltrimethoxysilane; methyltriacetoxysilane; vinyltriacetoxysilane; ethyltriacetoxysilane; di-butoxydiacetoxysilane; phenyltripropionoxysilane; methyltris(methylethylketoximo)silane; vinyltris(methylethylketoximo)silane; 3,3,3-trifluoropropyltris(methylethylketoximo)silane; methyltris(isopropenoxy)silane; vinyltris(isopropenoxy)silane; ethylpolysilicate; dimethyltetraacetoxydisiloxane; tetra-n-propylorthosilicate; methyldimethoxy(ethylmethylketoximo)silane; methylmethoxybis(ethylmethylketoximo)silane; methyldimethoxy(acetaldoximo)silane; methyldimethoxy(N-methylcarbamato)silane; ethyldimethoxy(N-methylcarbamato)silane; methyldimethoxyisopropenoxysilane; trimethoxyisopropenoxysilane; methyltriisopropenoxysilane; methyldimethoxy(but-2-en-2-oxy)silane; methyldimethoxy(1-phenylethenoxy)silane; methyldimethoxy-2-(1-carboethoxypropenoxy)silane; methylmethoxydi(N-methylamino)silane; vinyldimethoxy(methylamino)silane; tetra-N,N-diethylaminosilane; methyldimethoxy(methylamino)silane; methyltri(cyclohexylamino)silane; methyldimethoxy(ethylamino)silane; dimethyldi (N,N-dimethylamino)

silane; methyldimethoxy(isopropylamino)silane; dimethyldi(N,N-diethylamino)silane; ethyldimethoxy(N-ethylpropionamido)silane; methyldimethoxy(N-methylacetamido) silane; methyltris(N-methylacetamido) silane; ethyldimethoxy(N-methylacetamido)silane; methyltris(N-methylbenzamido)silane; methylmethoxybis(N-methylacetamido)silane; methyldimethoxy(caprolactamo)silane; trimethoxy(N-methylacetamido)silane; methyldimethoxy(ethylacetimidato)silane; methyldimethoxy(propylacetimidato)silane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane; methyldimethoxyisothiocyanatosilane; methylmethoxydiisothiocyanatosilane, or combinations of two or more thereof. In one embodiment, the crosslinker may be present in an amount from about 1 to about 10 wt. % of the composition or from about 0.1 to about 10 pt. wt. per 100 pt. wt. of the polymer component (A). In another embodiment, the crosslinker may be present in an amount from about 0.1 to about 5 pt. wt. per 100 pt. wt. of the polymer component (A). In still another embodiment, the crosslinker may be present in an amount from about 0.5 to about 3 pt. wt. per 100 pt. wt. of the polymer component (A). Here as elsewhere in the specification and claims, numerical values may be combined to form new or undisclosed ranges.

Additional alkoxysilanes in an amount greater than 0.1 wt. % of component (A) that are not consumed by the reaction between the prepolymer Z'—X—Z' and which comprise additional functional groups selected from $R^5$ can also work as an adhesion promoter and are defined and counted under component (D).

The curable compositions further comprise a catalyst (C) comprising an azaphosphatrane compound. The azaphosphatrane compound can be any suitable azaphosphatrane compound. In one embodiment, the azaphosphatrane compound can be chosen from a compound of any of formulas (1)-(4) described above. The catalyst component (C) can comprise a plurality of azaphosphatrane compounds. In one embodiment, the catalyst (C) comprises an azaphosphatrane compound of the formula (2).

The catalyst component (C) comprising the azaphosphatrane compound (3, 4) can be present in the curable composition in an amount of from about 0.01 to about 7 parts per weight per 100 parts per weight of the polymer (A); from about 0.05 to about 5 parts per weight per 100 parts per weight of the polymer (A); from about 0.1 to about 2 parts per weigh per 100 parts per weight of the polymer (A); even from about 0.2 to about 1 parts per weight per 100 parts per weight of the polymer (A). Here as elsewhere in the specification and claims, numerical values may be combined to form new and non-disclosed ranges.

The composition optionally includes an adhesion promoter component (D) that is different from component (A) or (B). In one embodiment, the adhesion promoter (D) may be an organofunctional silane comprising the group $R^5$, e.g., aminosilanes, and other silanes that are not identical to the silanes of component (B), or are present in an amount that exceeds the amount of silanes necessary for end capping the polymer (A). The amount of non-reacted silane (B) or (D) in the reaction for making (A) can be defined in that after the endcapping reaction the free silanes are evaporated at a higher temperature up to 200° C. and vacuum up to 1 mbar to be more than 0.1 wt. % of (A).

While the azaphosphatranes catalyst compounds can exhibit cure properties at least as good as tin catalysts, the adhesion promoters can be added to promote adhesion of the resulting cured material to a variety of substrates. The azaphosphatrane catalyst materials can be utilized with a variety of adhesion promoters without loss in catalytic activity as has been found with some metal-based, non-tin catalysts. The combination of the adhesion promoter with the azaphosphatrane catalyst can provide a composition exhibiting improved curing characteristics compared to the azaphosphatranes compound alone. Thus, some selected amines can advantageously be added to fine tune the rate of the azaphosphatrane catalyzed condensation curing of silicone/non-silicone polymer containing reactive silyl groups, as desired.

In one embodiment, the composition comprises an adhesion promoter (D) comprising a group $R^5$ as described by the general formula (10):

(10)

where $R^5$ is E-$(CR^3{}_2)_h$—W—$(CH_2)_h$—; $R^1$, $R^2$, and d are as described above; g is 1 or 2; d+g=1 to 2; and h is 0 to 8, and may be identical or different.

Non-limiting examples of suitable compounds include:

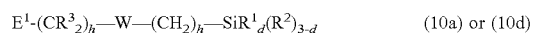

(10a) or (10d)

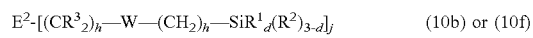

(10b) or (10f)

where j is 2 to 3.

The group E may be selected from either a group $E^1$ or $E^2$. $E^1$ may be selected from a monovalent group comprising amine, —$NH_2$, —NHR, —$(NHC_2H_5)_d$NHR, $NHC_6H_5$, halogen, pseudo pseudohalogen, unsaturated aliphatic group with up to 14 carbon atoms, epoxy-group-containing aliphatic group with up to 14 carbon atoms, cyanurate-containing group, and an isocyanurate-containing group.

$E^2$ may be selected from a group comprising a di- or multivalent group consisting of amine, polyamine, cyanurate-containing, and an isocyanurate-containing group, sulfide, sulfate, phosphate, phosphite, and a polyorganosiloxane group, which can contain $R^5$ and $R^2$ groups; W is selected from the group consisting of a single bond, a heteroatomic group selected from —COO—, —O—, epoxy, —S—, —CONH—, —HN—CO—NH— units; $R^3$ is as defined above, $R^1$ may be identical or different as defined above, $R^2$ is defined as above and may be identical or different.

Non-limiting examples of component (D) include:

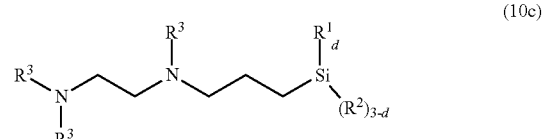

(10c)

(10d)

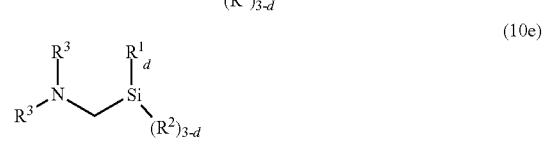

(10e)

-continued

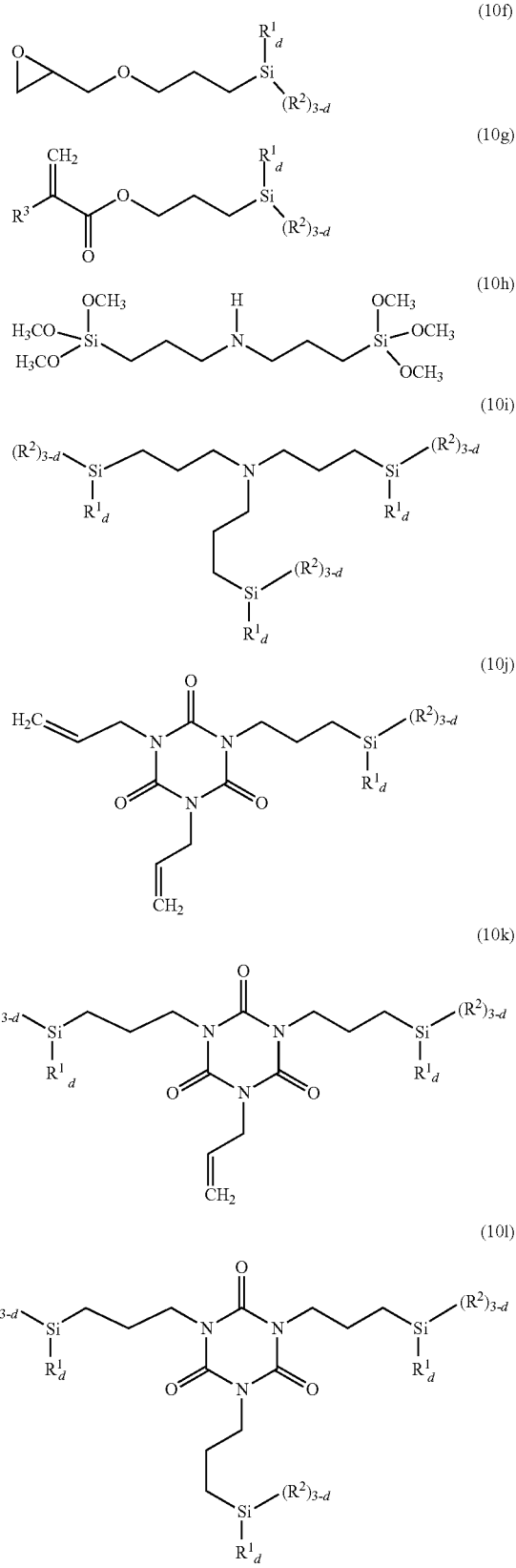

wherein R¹, R², and d are as defined above. Examples of component (D) include compounds of the formulas (7a-7l).

Furthermore the formula (7b) of compounds (D) shall comprise compounds of the formula (7m):

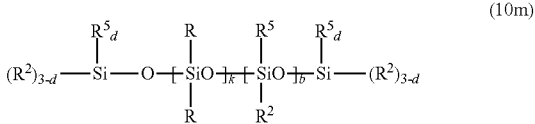

wherein: R, $R^2$, $R^5$, and d are as defined above; k is 0 to 6 (and in one embodiment desirably 0); b is as described above (in one embodiment desirably 0 to 5); and $1+b \leq 10$. In one embodiment, $R^5$ is selected from:

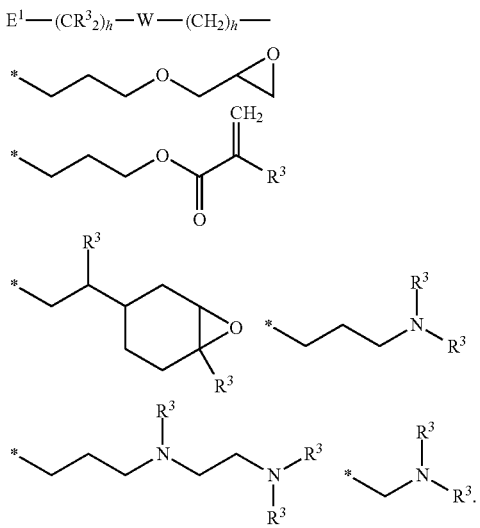

An exemplary group of adhesion promoters are selected from the group that consists of amino-group-containing silane coupling agents. The amino-group-containing silane adhesion promoter agent (D) is an acidic compound having a group containing a silicon atom bonded to a hydrolyzable group (hereinafter referred to as a hydrolyzable group attached to the silicon atom) and an amino group. Specific examples thereof include the same silyl groups with hydrolyzable groups described above. Among these groups, the methoxy group and ethoxy group are particularly suitable. The number of the hydrolyzable groups may be 2 or more, and particularly suitable are compounds having 3 or more hydrolyzable groups.

Examples of other suitable adhesion promoter (D) include, but are not limited to N-(2-aminoethyl)aminopropyltrimethoxysilane, gamma-aminopropyltriethoxysilane, gamma-aminopropyltrimethoxysilane, bis(3-trimethoxysilylpropyl)amine, N-phenyl-gamma-aminopropyltrimethoxysilane, triaminofunctionaltrimethoxysilane, gamma-aminopropylmethyldimethoxysilane, gamma-aminopropylmethyldiethoxysilane, methacryloxypropyltrimethoxysilane, methylaminopropyltrimethoxysilane, gamma-glycidoxypropylethyldimethoxysilane, gamma-glycidoxypropyltrimethoxysilane, gamma-glycidoxyethyltrimethoxysilane, gamma-glycidoxypropylmethyldimethoxysilane, gamma-glycidoxypropylmethyldiethoxysilane, beta-(3,4-epoxycyclohexyl)ethyltrimethoxysilane, beta-(3,4-epoxycyclohexyl)ethylmethyldimethoxysilane, beta-(3,4- epoxycyclohexyl)ethyltriethoxysilane, beta-(3,4-epoxycyclohexyl)ethylmethyldiethoxysilane, epoxylimonyltrimethoxysilane, isocyanatopropyltriethoxysilane, isocyanatopropyltrimethoxysilane, isocyanatopropylmethyldimethoxysilane, beta-cyanoethyltrimethoxysilane, gamma-acryloxypropyltrimethoxysilane, gamma-methacryloxypropylmethyldimethoxysilane, alpha, omega-bis(aminoalkyldiethoxysilyl)polydimethylsiloxanes (Pn=1-7), alpha, omega-bis(aminoalkyldiethoxysilyl)octamethyltetrasiloxane, 4-amino-3,3-dimethylbutyltrimethoxysilane, N-ethyl-3-trimethoxysilyl-2-methylpropanamine and 3-(N,N-diethylaminopropyl)trimethoxysilane combinations of two or more thereof, and the like.

Also it is possible to use derivatives obtained by modifying them, for example, amino-modified silyl polymer, silylated amino polymer, unsaturated aminosilane complex, phenylamino long-chain alkyl silane and aminosilylated silicone. These amino-group-containing silane coupling agents may be used alone, or two or more kinds of them may be used in combination.

The adhesion promoter (D) may be present in an amount of from about 0.1 to about 5.0 pt. wt. based on 100 parts of the polymer component (A). In one embodiment, the adhesion promoter may be present in an amount of from about 0.15 to about 2.0 pt. wt. based on 100 parts of the polymer component (A). In another embodiment, the adhesion promoter may be present in an amount of from about 0.5 to about 1.5 pt. wt of the polymer component (A). This defines the amount of (D) in composition of (A) wherein the content of free silanes coming from the endcapping of polymer (A) is smaller than 0.1 wt. %.

The present compositions may further include a filler component (E). The filler component(s) (E) may have different functions, such as to be used as reinforcing or semi-reinforcing filler, i.e., to achieve higher tensile strength after curing. The filler component may also have the ability to increase viscosity, establish pseudoplasticity/shear thinning, and demonstrate thixotropic behavior. Non-reinforcing fillers may act as volume extenders. The reinforcing fillers are characterized by having a specific surface area of more than 50 m$^2$/g related BET-surface, whereby the semi-reinforcing fillers have a specific surface area in the range of 10-50 m$^2$/g. So-called extending fillers have preferably a specific surface area of less than 10 m$^2$/g according to the BET-method and an average particle diameter below 100 μm. In one embodiment, the semi-reinforcing filler is a calcium carbonate filler, a silica filler, or a mixture thereof. Examples of suitable reinforcing fillers include, but are not limited to, fumed silicas or precipitated silicas, which can be partially or completely treated with organosilanes or siloxanes to make them less hydrophilic and decrease the water content or control the viscosity and storage stability of the composition. These fillers are named hydrophobic fillers. Tradenames are Aerosil®, HDK®, Cab-O-Sil® etc.

Examples of suitable extending fillers include, but are not limited to, ground silicas (Celite™), precipitated and colloidal calcium carbonates (which are optionally treated with compounds such as stearate or stearic acid); reinforcing silicas such as fumed silicas, precipitated silicas, silica gels and hydrophobized silicas and silica gels; crushed and ground quartz, cristobalite, alumina, aluminum hydroxide, titanium dioxide, zinc oxide, diatomaceous earth, iron oxide, carbon black, powdered thermoplastics such as acrylonitrile, polyethylene, polypropylene, polytetrafluoroethylene and graphite or clays such as kaolin, bentonite or montmorillonite (treated/untreated), and the like.

The type and amount of filler added depends upon the desired physical properties for the cured silicone/non-silicone composition. As such, the filler may be a single species or a mixture of two or more species. The extending fillers can be present from about 0 to about 300 wt. % of the composition related to 100 parts of component (A). The reinforcing fillers can be present from about 5 to about 60 wt. % of the composition related to 100 parts of component (A), preferably 5 to 30 wt. %.

The inventive compositions optionally comprise an acidic compound (F), which, in conjunction with the adhesion promoter and azaphosphatranes catalyst, can accelerate curing (as compared to curing in the absence of such compounds). The component (F) may be present in an amount of from about 0.01 to about 5 wt. % of the composition. In another embodiment 0.01 to about 8 parts per weight (pt. wt.) per 100 pt. wt. of component (A) are used, more preferably 0.02 to 3 pt. wt. per 100 pt. wt. of component (A) and most preferably 0.02 to 1 pt. wt. per 100 pt. wt. of component (A) are used.

The acidic compounds (F) may be chosen from various phosphate esters, phosphonates, phosphites, phosphonites, sulfites, sulfates, pseudo halogenides, branched alkyl carboxylic acids, combinations of two or more thereof, and the like. Without being bound to any particular theory, the acidic compounds (F) may, in one embodiment, be useful as stabilizers in order to ensure a longer storage time when sealed in a cartridge before use in contact with ambient air. Especially alkoxy-terminated polysiloxanes can lose the ability to cure after storage in a cartridge and show decreased hardness under curing conditions. It may, therefore be useful to add compounds of the formula (11), which can extend storage time or ability to cure over months.

$$O=P(OR^6)_{3-c}(OH)_c \qquad (11)$$

whereby c is as defined above; and R$^6$ is selected from the group of linear or branched and optionally substituted C$_1$-C$_{30}$ alkyl groups, linear or branched C$_5$-C$_{14}$ cycloalkyl groups, C$_6$-C$_{14}$ aryl groups, C$_6$-C$_{31}$ alkylaryl groups, linear or branched C$_2$-C$_{30}$ alkenyl groups or linear or branched C$_1$-C$_{30}$ alkoxyalkyl groups, C$_4$-C$_{300}$ polyalkenylene oxide groups (polyethers), such as Marlophor® N5 acid, triorganylsilyl- and diorganyl (C$_1$-C$_8$)-alkoxysilyl groups. The phosphates can include also mixtures of primary and secondary esters. Non-limiting examples of suitable phosphonates include 1-hydroxyethane-(1,1-diphosphonic acid) (HEDP), aminotris(methylene phosphonic acid) (ATMP), diethylenetriaminepenta(methylene phosphonic acid) (DTPMP), 1,2-diaminoethane-tetra(methylene phosphonicacid) (EDTMP), and phosphonobutanetricarboxylic acid (PBTC).

In another embodiment, a compound of the formula O=P(OR$^7$)$_{3-g}$(OH)$_g$ may be added where g is 1 or 2, and R$^7$ is defined as R$^6$ or di- or mulitvalent hydrocarbons with one or more amino group.

Another type are phosphonic acid compounds of the formula R$^6$P(O)(OH)$_2$ such as alkyl phosphonic acids preferably hexyl or octyl phosphonic acid.

In one embodiment, the acidic compound may be chosen from a mono ester of phosphoric acid of the formula (R$^8$O)PO(OH)$_2$; a phosphonic acid of the formula R$^8$P(O)(OH)$_2$; or a monoester of phosphorous acid of the formula (R$^8$O)P(OH)$_2$ where R$^8$ is a C$_1$-C$_{18}$ alkyl, a C$_2$-C$_{20}$ alkoxyalkyl, phenyl, a C$_7$-C$_{12}$ alkylaryl, a C$_2$-C$_4$ polyalkylene oxide ester or its mixtures with diesters, etc.

In another embodiment, the acidic compound is a branched C$_4$-C$_{30}$ alkyl carboxylic acids, including C$_5$-C$_{19}$ acids with an alpha tertiary carbon, or a combination of two or more thereof. Examples of such suitable compounds include, but are not limited to, Versatic™ Acid, lauric acid, and stearic acid. In one embodiment, the acidic compound may be a mixture comprising branched alkyl carboxylic acids. In one embodiment, the acidic compound is a mixture of mainly tertiary aliphatic $C_{10}$ carboxylic acids.

Generally, the acidic component (F) is added in a molar ratio of less than or equal to 1 with respect to catalyst (C). In embodiments, the acidic component (F) is added in a molar ratio of (F):(C) of 1:15 to 1:1.

The curable composition may also include auxiliary substances (G) such as plasticizers, pigments, stabilizers, antimicrobial agents, fungicides, biocides, and/or solvents. Preferred plasticizers for reactive polyorganosiloxanes (A) are selected from the group of polyorganosiloxanes having chain lengths of 10 to 300 siloxy units. Preferred are trimethylsilyl terminated polydimethylsiloxanes having a viscosity of 100 to 1000 mPa·s at 25° C. The choice of optional solvents (dispersion media or extenders) may have a role in assuring uniform dispersion of the catalyst, thereby altering curing speed. Such solvents include polar and non-polar solvents such as toluene, hexane, chloroform, methanol, ethanol, isopropyl alcohol, acetone, methylethyl ketone, dimethylformamide (DMF), dimethyl sulfoxide (DMSO), N-methylpyrrolidinone (NMP), and propylene carbonate. Water can be an additional component (G) to accelerate fast curing 2-part compositions RTV-2, whereby the water can be in one part of the 2 compositions. Particularly suitable non-polar solvents include, but are not limited to, toluene, hexane, and the like if the solvents should evaporate after cure and application. In another embodiment, the solvents include high-boiling hydrocarbons such as alkylbenzenes, phtalic acid esters, arylsulfonic acid esters, trialkyl- or triarylphosphate esters, which have a low vapor pressure and can extend the volume providing lower costs. Examples cited by reference may be those of U.S. Pat. No. 6,599,633; U.S. Pat. No. 4,312,801. The solvent can be present in an amount of from about 20 to about 99 wt. % of the catalyst composition.

In one embodiment, a composition in accordance with the present invention comprises: 100 pt. wt. polymer component (A); about 0.1 to about 10 pt. wt. crosslinker component (B); and about 0.01 to about 7 pt. wt. catalyst component (C). In one embodiment, the composition further comprises from about 0.1 to about 5, in one embodiment 0.15 to 1 pt. wt., of an adhesion promoter component (D); about 0 to about 300 pt. wt. filler component (E); about 0.01 to about 7 pt. wt. of acidic compound (F); optionally 0 to about 15 pt. wt. component (G), where the pt. wt. of components (B)-(G) are each based on 100 parts of the polymer component (A). In one embodiment, the composition comprises the component (F) in an amount of from about 0.01 to about 1 pt. wt. per 100 pt. wt. of component (A). In still another embodiment, the composition comprises the catalyst (C) in an amount of from about 0.1 to about 0.8 wt. pt. per 100 wt. pt of component (A).

It will be appreciated that the curable compositions may be provided as either a one-part composition or a two-part composition. A one-part composition refers to a composition comprising a mixture of the various components described above. A two-part composition may comprise a first portion and a second portion that are separately stored and subsequently mixed together just prior to application for curing. In one embodiment, a two-part composition comprises a first portion (P1) comprising a polymer component (A) and a crosslinker component (B), and a second portion (P2) comprising the catalyst component (C) comprising an azaphosphatrane compound. The first and second portions may include other components (D) and/or (E) and/or (F) and/or (G) as may be desired for a particular purpose or intended use. For example, in one embodiment, the first portion (P1) may optionally comprise an adhesion promoter (D) and/or a filler (E), and the second portion (P2) may optionally comprise auxiliary substances (G), a cure rate modifying component (F), and water (G).

In one embodiment, a two-part composition comprises (i) a first portion comprising the polymer component (A), optionally the filler component (E), and optionally the acidic compound (F); and (ii) a second portion comprising the crosslinker (B), the catalyst component (C), the adhesive promoter (D), and the acidic compound (F), where portions (i) and (ii) are stored separately until applied for curing by mixing of the components (i) and (ii).

An exemplary two-part composition comprises: a first portion (i) comprising 100 pt. wt. of component (A), and 0 to 70 pt. wt. of component (E); and a second portion (ii) comprising 0.1 to 5 pt. wt. of at least one crosslinker (B); 0.01 to 4 pt. wt. of a catalyst (C); 0.1 to 2 pt. wt. of an adhesion promoter (D); and optionally, 0.02 to 1 pt. wt. component (F).

The curable compositions may be used in a wide range of applications including as materials for sealing, mold making, glazing, proto-typing, as adhesives, as coatings, as joint seal between different materials, e.g., sealants between ceramic or mineral surfaces and thermoplastics, as paper release, as impregnation materials, and the like. A curable composition in accordance with the present invention comprising an amidine compound as a catalyst may be suitable for a wide variety of applications such as, for example, a general purpose and industrial sealant, potting compound, caulk, adhesive or coating for construction use, insulated glass, structural glazing, where glass sheets are fixed and sealed in metal frame; caulks, adhesives for metal plates, car bodies, vehicles, electronic devices, and the like. Furthermore, the present composition may be used either as a one-part RTV-1 or as a two-part RTV-2 formulation that can adhere onto broad variety of metal, mineral, ceramic, rubber, or plastic surfaces.

EXAMPLES

Ring Opening Polymerization

The ring opening polymerization of octamethylcyclotetrasiloxane (D4) with hexamethyldisiloxane is performed with an azaphosphatrane of formula (2) as a catalyst, where $R^9$-$R^{11}$ are each isobutyl or methyl. The catalyst is provided at loading ranging from 0.1 wt % to 0.4 wt %. The catalyst is added as a neat liquid or as solid and is completely miscible in the reaction mixture. Comparative examples employ a heterogeneous acid type catalyst and a soluble base type catalyst (Table 1).

Example 1

Octamethylcyclotetrasiloxane (100 gm, 0.3365 moles), and hexamethyldisiloxane (0.82 gm, 5.03 mmol) was taken in a round bottom flask fitted with a water cooling condenser. The catalyst isobutyl substituted azaphosphatrane (2) (0.1 gm, 0.292 mmol) was added. The reaction mixture was kept in an oil bath maintained at 100° C. Samples were taken periodically and the volatile content of the sample was recorded to monitor the extent of reaction. A volatile content of 69.1% was measured after 5 h of reaction.

Example 2

Octamethylcyclotetrasiloxane (100 gm, 0.3365 moles), and hexamethyldisiloxane (0.82 gm, 5.03 mmol) was taken in a round bottom flask fitted with a water cooling condenser. The catalyst isobutyl substituted azaphosphatrane (2) (0.4 gm, 1.168 mmol) was added. The reaction mixture was kept in an oil bath maintained at 100° C. Samples were taken periodically and the volatile content of the sample was recorded to monitor the extent of reaction. A volatile content of 16.2% was measured after 2 h of reaction.

Example 3

Octamethylcyclotetrasiloxane (100 gm, 0.3365 moles), and hexamethyldisiloxane (0.82 gm, 5.03 mmol) was taken in a round bottom flask fitted with a water cooling condenser. The catalyst methyl substituted azaphosphatrane (2) (0.4 gm, 1.85 mmol) was added. The reaction mixture was kept in an oil bath maintained at 100° C. Samples were taken periodically and the volatile content of the sample was recorded to monitor the extent of reaction. A volatile content of 51% was measured after 4 h of reaction.

Example 4

Octamethylcyclotetrasiloxane (20 gm, 0.067 moles), silanol terminated poly(dimethylsiloxane) (80 gm) and hexamethyldisiloxane (0.82 gm, 5.03 mmol) was taken in a round bottom flask fitted with a water cooling condenser. The catalyst isobutyl substituted azaphosphatrane (2) (0.4 gm, 1.16 mmol) was added. The reaction mixture was kept in an oil bath maintained at 100° C. Samples were taken periodically and the volatile content of the sample was recorded to monitor the extent of reaction. A volatile content of 14% was measured after 1 h of reaction.

Example 5

Octamethylcyclotetrasiloxane (20 gm, 0.067 moles), silanol terminated poly(dimethylsiloxane) (80 gm) and hexamethyldisiloxane (0.82 gm, 5.03 mmol) was taken in a round bottom flask fitted with a water cooling condenser. The catalyst isobutyl substituted azaphosphatrane (2) (0.1 gm, 0.29 mmol) was added. The reaction mixture was kept in an oil bath maintained at 100° C. Samples were taken periodically and the volatile content of the sample was recorded to monitor the extent of reaction. A volatile content of 20% was measured after 3 h of reaction.

Example 6

Octamethylcyclotetrasiloxane (20 gm, 0.067 moles), silanol terminated poly(dimethylsiloxane) (80 gm) and hexamethyldisiloxane (0.82 gm, 5.03 mmol) was taken in a round bottom flask fitted with a water cooling condenser. The catalyst isobutyl substituted azaphosphatrane (2) (0.05 gm, 0.145 mmol) was added. The reaction mixture was kept in an oil bath maintained at 100° C. Samples were taken periodically and the volatile content of the sample was recorded to monitor the extent of reaction. A volatile content of 30% was measured after 3 h of reaction.

Example 7

Octamethylcyclotetrasiloxane (20 gm, 0.067 moles), silanol terminated poly(dimethylsiloxane) (80 gm) and hexamethyldisiloxane (0.82 gm, 5.03 mmol) was taken in a round bottom flask fitted with a water cooling condenser. The catalyst isobutyl substituted azaphosphatrane (2) (0.025 gm, 0.0725 mmol) was added. The reaction mixture was kept in an oil bath maintained at 100° C. Samples were taken periodically and the volatile content of the sample was recorded to monitor the extent of reaction. A volatile content of 28% was measured after 4 h of reaction.

Example 8

Octamethylcyclotetrasiloxane (100 gm, 0.3355 moles), and 1.3 divinyltetramethyldisiloxane (0.89 gm, 4.77 mmol) was taken in a round bottom flask fitted with a water cooling condenser. The catalyst isobutyl substituted azaphosphatrane (2) (0.25 gm, 0.725 mmol) was added. The reaction mixture was kept in an oil bath maintained at 100° C. Samples were taken periodically and the volatile content of the sample was recorded to monitor the extent of reaction. A volatile content of 13.1% was measured after 6 h of reaction.

Example 9

Silanol terminated poly(dimethylsiloxane) (93 gm) and methyl terminated poly(dimethylsiloxane) (viscocity—100 cst, 11.0 gm) was taken in a round bottom flask fitted with a water cooling condenser. The catalyst isobutyl substituted azaphosphatrane (2) (0.4 gm, 1.16 mmol) was added. The reaction mixture was kept in an oil bath maintained at 100° C. Samples were taken periodically and the volatile content of the sample was recorded to monitor the extent of reaction. A volatile content of 12.3% was measured after 1 h of reaction.

Example 10

Comparative Example

Octamethylcyclotetrasiloxane (100 gm, 0.3365 moles), and hexamethyldisiloxane (0.82 gm, 5.03 mmol) was taken in a round bottom flask fitted with a water cooling condenser. 0.4 wt % of a base type catalyst was added. The reaction mixture was kept in an oil bath maintained at 100° C. Samples were taken periodically and the volatile content of the sample was recorded to monitor the extent of reaction. A volatile content of 18.6% was measured after 5 h of reaction.

Example 11

Comparative Example

Octamethylcyclotetrasiloxane (100 gm, 0.3365 moles), and hexamethyldisiloxane (0.82 gm, 5.03 mmol) was taken in a round bottom flask fitted with a water cooling condenser. 0.4 wt % of a acid type catalyst was added. The reaction mixture was kept in an oil bath maintained at 100° C. Samples were taken periodically and the volatile content of the sample was recorded to monitor the extent of reaction. A volatile content of 11.6% was measured after 4 h of reaction.

Example 12

Comparative Example

Octamethylcyclotetrasiloxane (20 gm, 0.067 moles), silanol terminated poly(dimethylsiloxane) (80 gm) and hexamethyldisiloxane (0.82 gm, 5.03 mmol) was taken in a round bottom flask fitted with a water cooling condenser. 0.4 wt % of a base type catalyst was added and the reaction mixture was kept in an oil bath maintained at 100° C. Samples were taken periodically and the volatile content of the sample was recorded to monitor the extent of reaction. A volatile content of 9.8% was measured after 3 h of reaction.

Example 13

Comparative Example

Octamethylcyclotetrasiloxane (20 gm, 0.067 moles), silanol terminated poly(dimethylsiloxane) (80 gm) and hexamethyldisiloxane (0.82 gm, 5.03 mmol) was taken in a round bottom flask fitted with a water cooling condenser. 0.4 wt % of an acid type catalyst was added and the reaction mixture was kept in an oil bath maintained at 100° C. Samples were taken periodically and the volatile content of the sample was recorded to monitor the extent of reaction. A volatile content of 13.7% was measured after 3 h of reaction.

Table 1 illustrates aspects of the above reactions.

TABLE 1

Ring opening polymerization of siloxanes.

| Example | Catalyst system | Loading (wt %) | Temperature (° C.) | Time | % Volatile content |
|---|---|---|---|---|---|
| 1 | Isobutylsubstituted Azaphosphatrane 2 | 0.1 | 100 | 5 h | 69.1 |
| 2 | Isobutylsubstituted Azaphosphatrane 2 | 0.4 | 100 | 2 h | 16.2 |
| 3 | Methylsubstituted Azaphosphatrane 2 | 0.4 | 100 | 4 h | 51 |
| 4 | Isobutylsubstituted Azaphosphatrane 2 | 0.4 | 100 | 1 h | 14 |
| 5 | Isobutylsubstituted Azaphosphatrane 2 | 0.1 | 100 | 3 h | 20 |
| 6 | Isobutylsubstituted Azaphosphatrane 2 | 0.05 | 100 | 3 h | 30 |
| 7 | Isobutylsubstituted Azaphosphatrane 2 | 0.025 | 100 | 4 h | 28 |
| 8 | Isobutylsubstituted Azaphosphatrane 2 | 0.25 | 100 | 6 h | 13.1 |
| 9 | Isobutylsubstituted Azaphosphatrane 2 | 0.4 | 100 | 1 h | 12.3 |
| 10 | Base type catalyst (Comparative Example) | 0.4 | 100 | 5 h | 18.6 |
| 11 | Acid type catalyst (Comparative Example) | 0.4 | 100 | 4 h | 11.6 |
| 12 | Base type catalyst (Comparative Example) | 0.4 | 100 | 3 h | 9.8 |
| 13 | Acid type catalyst (Comparative Example) | 0.4 | 100 | 3 h | 13.7 |

The polymerization reached equilibration in 2-4 hours with the azaphosphatrane catalyst whereas the reaction took between 3-5 hours to reach equilibration with the acid and basic type catalysts at the same catalyst loading. This indicates that the cycle time can be lowered, in some instances by almost two times, with azaphosphatrane as the catalyst. The volatile content with each catalyst after polymerization is 11.6% to 13.7% with the acid type catalyst, 9.8% to 18.63% with the basic type catalyst, and 12.3% to 69.1% with the asaphosphatrane catalysts, respectively. Table 1 also shows that the polymerization can be carried out successfully with significantly lower catalyst loadings when using the asaphosphatrane material as the catalyst.

With silanol containing poly(dimethylsiloxane), octamethylcyclotetrasiloxane and hexamethyldisiloxane as raw materials, the equilibration is reached in 1 hour when azaphosphatrane is used as a catalyst at a catalyst loading of 0.4 wt %. While equilibration is reached in 2.5 hours with the acid type catalyst and 3 hours with soluble basic catalyst.

The catalyst is deactivated in the system by heating the reaction system to a temperature greater than 120° C. The samples are then treated by passing through a celite bed and then treating with charcoal to remove any yellow color from the product.

Example 14

Condensation Cure

To 4.0 g of silanol terminated poly(dimethylsiloxane) and 0.5 g of methyltrimethoxysilane, varied amounts of isobutyl substituted azaphosphatrane (3) is added. The quantity is varied from 10 mg to 40 mg and is added as a neat material. The reaction mixture is kept at ambient room temperature to monitor curing. Cured material is formed.

Example 15

Condensation Cure

To 4.0 g of silanol terminated poly(dimethylsiloxane) and 0.5 g of methyltrimethoxysilane, varied amounts of methyl substituted azaphosphatrane (3) is added. The quantity is varied from 10 mg to 40 mg and is added as a neat material. The reaction mixture is kept at ambient room temperature to monitor curing. Cured material is formed.

Example 16

Condensation Cure

To 4.0 g of silanol terminated poly(dimethylsiloxane) and 0.5 g of methyltrimethoxysilane, varied amounts of isobutyl substituted azaphosphatrane (4) is added. The quantity is varied from 10 mg to 40 mg and is added as a neat material. The reaction mixture is kept at ambient room temperature to monitor curing. Cured material is formed.

Example 15

Condensation Cure

To 4.0 g of silanol terminated poly(dimethylsiloxane) and 0.5 g of methyltrimethoxysilane, varied amounts of methyl substituted azaphosphatrane (4) is added. The quantity is varied from 10 mg to 40 mg and is added as a neat material. The reaction mixture is kept at ambient room temperature to monitor curing. Cured material is formed.

Embodiments of the invention have been described above and modification and alterations may occur to others upon the reading and understanding of this specification. The claims as follows are intended to include all modifications and alterations insofar as they come within the scope of the claims or the equivalent thereof.

What is claimed is:

1. A process for the synthesis of a siloxane polymer by ring opening polymerization of a cyclosiloxane comprising contacting a cyclosiloxane with an azaphosphatrane.

2. The process of claim 1, wherein the azaphosphatrane is of the formula:

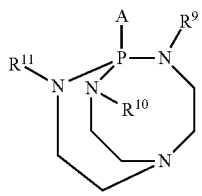

where $R^9$, $R^{10}$, $R^{11}$ and are independently chosen from hydrogen, a linear or branched alkyl comprising 1 to 10 carbon atoms, and an aromatic group comprising 6 to 12 carbon atoms, and a substituted phosphorous group with or without nitrogen; and A is chosen from hydrogen, $R^{12}$, or $(R^{13}R^{14}P-N=)t$, where $R^{12}$, $R^{13}$, and $R^{14}$ are independently chosen from hydrogen, a linear or branched alkyl comprising 1 to 10 carbon atoms, and an aromatic group comprising 6 to 12 carbon atoms; and t is 1 to 10.

3. The process of claim 2, wherein the azaphosphatrane is chosen from a compound of the formulas:

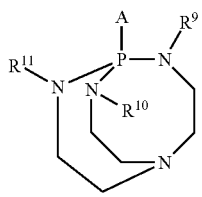

wherein A is hydrogen;

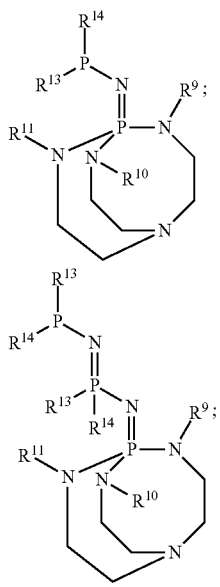

or a combination of two or more thereof.

4. The process of claim 1, comprising an azaphosphatrane compound of the formula:

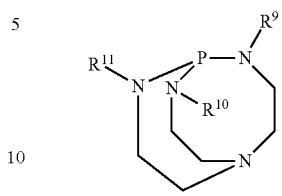

where $R^9$, $R^{10}$, and $R^{11}$ are independently chosen from methyl, isopropyl, or isobutyl.

5. The process of claim 1, wherein the azaphosphatrane is present in an amount of from about 0.025 weight percent to about 5 weight percent based on the total weight of the cyclosiloxane.

6. The process of claim 1, wherein the azaphosphatrane is present in an amount of from about 0.1 weight percent to about 0.4 weight percent based on the total weight of the cyclosiloxane.

7. The process of claim 1, wherein the cyclosiloxane is of the formula $(R^{15}R^{16}SiO)_n$, wherein $R^{15}$ and $R^{16}$ are independently chosen from hydrogen or an optionally substituted alkyl, alkenyl, aryl, alkaryl or aralkyl group having up to 8 carbon atoms, n denotes an integer with a value of from 3 to 12.

8. The process of claim 1, wherein the cyclosiloxene is chosen from octamethyl cyclotetrasiloxane (D4), hexamethylcyclotrisiloxane (D3), octaphenylcyclotetrasiloxane, tetramethylcyclotetrasiloxane, tetramethyltetravinylcyclotetrasiloxane, hexamethyl-1,1-diphenylcyclotetrasiloxane, decamethyl pentacyclosiloxane, cyclopenta (methylvinyl) siloxane, cyclotetra(phenylmethyl) siloxane, cyclopenta methylhydrosiloxane, or a combination of two or more thereof.

9. The process of claim 1 comprising two or more cyclosiloxanes, along with silanol or methyl terminated poly(dimethylsiloxane) where at least two cyclosiloxanes have a different ring size from each other.

10. The process of claim 1, wherein the process comprises adding an endblocker material.

11. The process of claim 10, wherein the endblocker material is chosen from hexamethyl di siloxane; octamethyltrisiloxane; decamethyltetrasiloxane; dodecamethylpentasiloxane; tetradecamethylhexasiloxane; hexadecamethylheptasiloxane, or a combination of two or more thereof.

12. The process of claim 1 further comprising deactivating the catalyst.

13. The process of claim 12, wherein deactivating the catalyst comprises: heating the product of the process at a temperature of about 100° C. or greater after the reaction; treating the product with water; bubbling carbon dioxide through the product; treating the product with a material to neutralize the catalyst, or a combination of two or more thereof.

14. The process of claim 12 further comprising filtering the reaction mixture.

15. The process of claim 14 further comprising treating the filtered reaction mixture with charcoal.

* * * * *